(12) United States Patent
Ahmed et al.

(10) Patent No.: US 9,996,129 B2
(45) Date of Patent: Jun. 12, 2018

(54) ELECTRICALLY POWERED COMPUTER SYSTEM AND POWER SUPPLY SYSTEM FOR SAME

(71) Applicant: ABB Technology Ltd., Zürich (CH)

(72) Inventors: Sara Ahmed, Cary, NC (US); Zhenyuan Wang, Morrisville, NC (US); Francisco Canales, Daettwil-Baden (CH)

(73) Assignee: ABB SCHWEIZ AG, Baden (CH)

( * ) Notice: Subject to any disclaimer, the term of this patent is extended or adjusted under 35 U.S.C. 154(b) by 449 days.

(21) Appl. No.: 14/825,720

(22) Filed: Aug. 13, 2015

(65) Prior Publication Data

US 2017/0045924 A1    Feb. 16, 2017

(51) Int. Cl.
*G06F 1/26*    (2006.01)
*G05F 1/66*    (2006.01)

(52) U.S. Cl.
CPC ............... *G06F 1/263* (2013.01); *G05F 1/66* (2013.01); *G06F 1/266* (2013.01)

(58) Field of Classification Search
CPC ............. G06F 1/263; G06F 1/266; G05F 1/66
See application file for complete search history.

(56) References Cited

U.S. PATENT DOCUMENTS

| 7,462,954 | B2 | 12/2008 | Kraus |
| 7,602,625 | B2 | 10/2009 | Belson et al. |
| 9,559,607 | B1 * | 1/2017 | Wang ............... G06F 1/3287 |
| 2005/0105314 | A1 * | 5/2005 | Nielsen ............ H02M 7/487 |
| | | | 363/132 |
| 2006/0284489 | A1 | 12/2006 | Gross et al. |
| 2010/0141039 | A1 | 6/2010 | Belady et al. |
| 2011/0148213 | A1 | 6/2011 | Baldwin et al. |
| 2012/0056481 | A1 | 3/2012 | Corhodzic et al. |
| 2013/0002027 | A1 * | 1/2013 | Yu ..................... H02J 9/061 |
| | | | 307/66 |

FOREIGN PATENT DOCUMENTS

WO    WO 2014026840 A2 *    2/2014    ........ H02M 3/33523

OTHER PUBLICATIONS

M. Baldwin, et al., "Higher Voltage DC (HVDC) Power Solutions for Critical Power Environments", Direct Power Technologies, Inc., at least as early as Oct. 6, 2014, 67 pgs, available at www.directpowertech.com/docs/DC-PRESENTATION.pdf.

(Continued)

*Primary Examiner* — Jared Fureman
*Assistant Examiner* — Michael Warmflash
(74) *Attorney, Agent, or Firm* — J. Bruce Schelkopf; Taft Stettinius & Hollister LLP

(57) ABSTRACT

An uninterruptible power supply system includes an AC input interface and a DC output interface, and a plurality of power supply paths coupled between the AC and DC interfaces. A first one of the power supply paths has a lower component count, whereas a second one of the power supply paths has a higher component count. At least one of the power supply paths is structured to supply DC electrical power to a power bus in the DC output interface at a varying voltage.

17 Claims, 3 Drawing Sheets

(56) References Cited

OTHER PUBLICATIONS

M. Noritake et al., "Verification of 380 Vdc Distribution System Availability Based on Demonstration Tests," 2011 IEEE 33rd International Telecommunications Energy Conference (INTELEC), Oct. 9, 2011, 67 pgs, Amsterdam, Netherlands.
E.C.W. De Jong et al., "DC Power Distribution for Server Farms," Leonardo Energy, Sep. 2007, 14 pgs, available at http://www.directpowertech.com/docs/LEONARDO%20ENERGY.pdf.
N. Rasmussen et al., "A Quantitative Comparison of High Efficiency AC v. DC Power Distribution for Data Centers," Schneider Electric, at least as early as Oct. 6, 2014, 21 pgs, available at https://www.anixter.com/content/dam/Suppliers/APC/White%20Paper/A%20Quantitatve%20Comparison.pdf.
N. Rasmussen, "The Different Types of UPS Systems," Schneider Electric, at least as early as Oct. 6, 2014, 10 pgs, available at http://www.apc.com/us/en/faqs/FA157448/.
F. Bodi et al., "380/400V DC Powering Option," 2011 IEEE 33rd International Telecommunications Energy Conference (INTELEC), Oct. 9, 2011, 8 pgs, Amsterdam, Netherlands.
F. Bodi et al., "Criteria for Emerging Telecom and Data Center Powering Architectures," Intelec 2012, Sep. 30, 2012, 9 pgs, Scottsdale, Arizona.

\* cited by examiner

ELECTRICALLY POWERED COMPUTER SYSTEM AND POWER SUPPLY SYSTEM FOR SAME

TECHNICAL FIELD

The present disclosure relates generally to power supplies as are used in computer datacenters, and relates more particularly to an uninterruptible power supply system where multiple power supply paths have different component counts.

BACKGROUND

A great many different architectures and operating strategies have been proposed for electrical power supply and distribution over the years. In certain environments, it is desirable to have redundant or backup power available in the event of the failure of a primary power supply. One known design includes multiple, fully redundant pathways of essentially identical structure. Such systems provide reliable operation; however, there is always room for improvement.

SUMMARY

A power supply system includes an alternating current (AC) input interface and a direct current (DC) output interface, in a plurality of power supply paths extending between the AC input interface and the DC output interface. A first one of the plurality of power supply paths has a lower component count, and a second one of the plurality of power supply paths has a higher component count. Each power supply path has a power converter structured to convert AC electrical power to DC electrical power. One of the power supply paths provides electrical power at a varying voltage, whereas the other provides electrical power at a fixed voltage.

DETAILED DESCRIPTION OF ILLUSTRATIVE EMBODIMENTS

Figure 1:
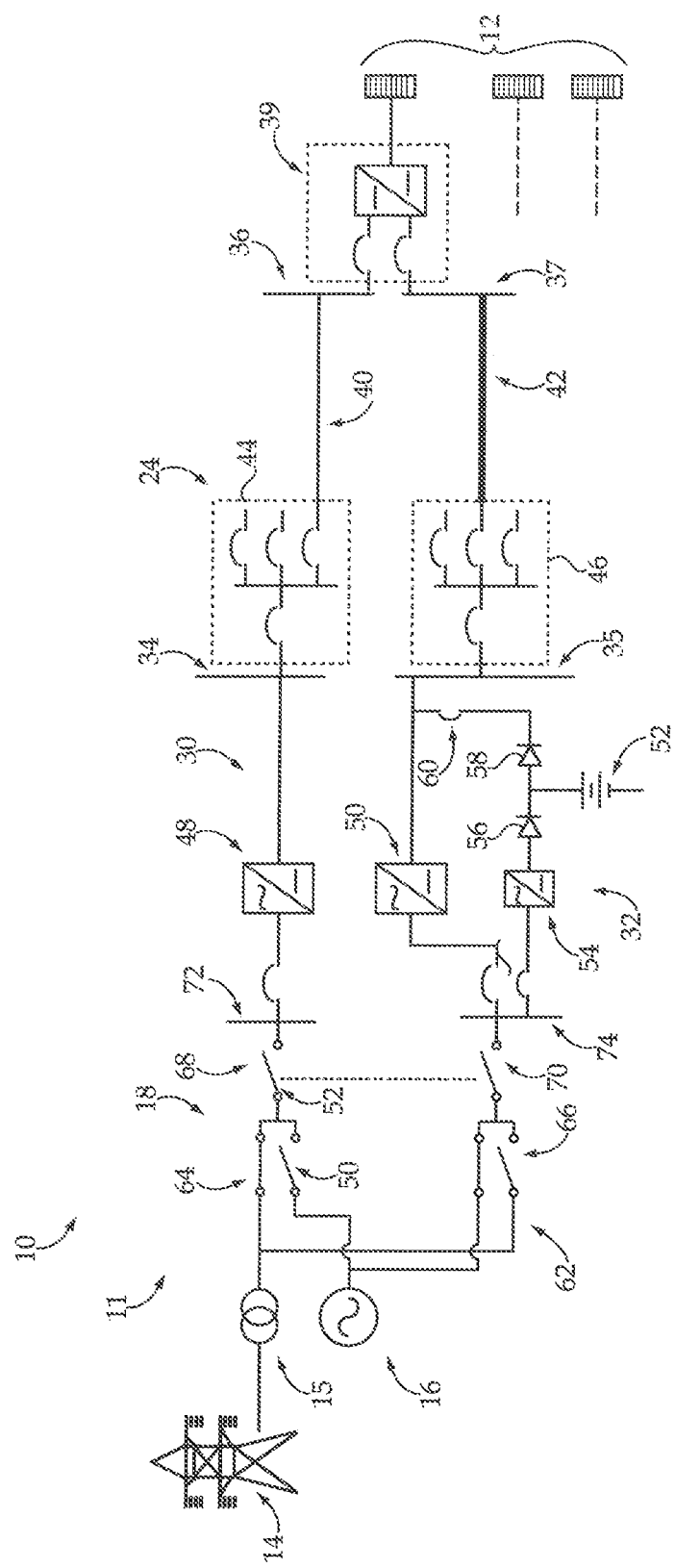
FIG. 1 a diagrammatic view of a system according to one embodiment.

For purposes of promoting an understanding of the principles of the ELECTRICALLY POWERED COMPUTER SYSTEM AND POWER SUPPLY SYSTEM FOR SAME, reference will now be made to the examples illustrated in the drawings, and specific language will be used to describe the same. It will nonetheless be understood that no limitation of the scope of the invention is intended by the illustration and description of certain examples of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there is shown an electrically powered computer system 10, according to one embodiment. System 10 may include a plurality of electrically powered computers, such as computers servers having non-volatile and also volatile memory, and depending for successful and continuous operation upon having uninterrupted electrical power. System 10 may be equipped with a power supply system in the nature of an uninterruptable power supply (UPS) system 11 for continuously supplying electrical power to computers 12. A primary power supply 14, such as a 3-phase alternating current (AC) electrical power grid may be coupled with system 11 such as by way of a step down transformer 15. A secondary power supply 16 may be coupled with or part of system 11. The terms primary and secondary should not be taken to mean that one of power supply 14 and power supply 16 is necessarily used preferentially over the other, although such could certainly be the case. Power supply 16 might include a conventional electric generator such as a combustion powered generator, but might alternatively include an electrical energy storage medium such as a capacitor bank, batteries an energy storage flywheel, or a different type of power generating mechanism such as a fuel cell, a solar array, or still others.

System 11 may further include an AC input interface 18 structured to couple with AC electrical power supply 14, and potentially also with power supply 16. System 11 may also include a DC output interface 24 having at least one remote power panel 36, 37, and in the illustrated embodiment two remote power panels. System 11 may also include a plurality of power supply path 30, 32 structured to supply electrical power from the AC input interface 18 to DC output interface 24 so as to energize remote power panels 36 and 37 for powering an electrical load such as computers 12. As will be further apparent from the following description, system 11 is uniquely configured for reliability and redundancy in power supply while providing reduced costs and complexity as compared with known designs.

System 11 may further include one or more power supply units 39 that feed computers 12. Input circuitry 62 is provided and includes appropriate switching elements 64 and 66 which may have the form of automated transfer switches (ATS), structured to connect either one of power supplies 14 and 16 to either one of power supply paths 30 and 32. Maintenance switches 68 and 70 may be provided so as to enable selectively disconnecting circuitry 62 or parts of circuitry 62 from either or both of power supply paths 30 and 32.

DC output interface 24 may further include at least one power bus 34 structured to receive DC electrical power from power supply paths 30, 32, and in the illustrated embodiment includes a first power bus 34 associated with first power supply path 30 and a second power bus 35 associated with power supply path 32. A DC feeder 40 is also provided as a part of or coupled with output interface 24 and structured to feed DC electrical power from power supply paths 30, 32, or one of those power supply paths, to remote power panel 36 and/or 37, or a single remote power panel as the case may be. A first power distribution unit 44 forms part of DC output interface 24 and is associated with bus 34 and first power supply path 30, whereas a second power distribution unit 46 is associated with bus 35 and receives electrical power via power supply path 32. Each of power supply paths 30 and 32 may include a power converter 48 and 50, respectively, structured to convert AC electrical power from AC input interface 18 to DC electrical power to be supplied to power bus 34 and power bus 35. A power converter, charger, and battery may be provided together as one physical unit in a practical implementation strategy. In one embodiment, power converter 48 in first power supply path 30 converts AC electrical power to DC electrical power at a fixed voltage, and power converter 50 likewise converts AC electrical power to DC electrical at a fixed voltage. It will be recalled that DC feeders 40 and 42 are coupled between buses 34 and 35 and remote power panels 36 and 37, respectively. In the embodiment of FIG. 1, DC feeder 40 has standard electrical cabling structured for supplying DC electrical power at the fixed voltage. DC feeder 42 may have oversized electrical cabling structured for supplying DC electrical power at a varying voltage, the significance of which will be apparent from the following description. The selection and suitability of certain other components, including power supply components such as converter 50 and power distribution unit 46, can be analogously affected.

Those skilled in the art of redundant and uninterruptible power supply systems will be familiar with certain hardware differences among fixed voltage systems and varying voltage systems. Where voltage is predictable and reliable, hardware components such as cabling can be relatively less expensive than in instances where voltage is varying. In the case of systems where voltage is expected to vary, the less expensive fixed voltage hardware is generally unavailable. In a practical implementation strategy, each of power converter 48 and power converter 50 may include an AC to DC buck converter, otherwise known as a buck rectifier or step down converter. Each buck rectifier can be of a variety of different topologies and constructions, including a passive rectifier such as a thyristor-based rectifier. An actively controlled rectifier can also be used. The choice of rectifier may depend upon control and dynamics requirements of critical loads in computers 12, such as critical loads where computers 12 are part of a data center and thus corresponding to a minimum electrical power supply requirement to avoid data losses. Harmonics requirements or properties of power supply 14 and potentially power supply 16 can also affect selection of a suitable rectifier.

As noted above, each of converters 48 and 50 can generally supply DC electrical power to the corresponding bus 34 and 33 at a fixed voltage. As it is desirable to provide a backup power supply, second power supply path 32 is equipped with an energy storage device 52 such as a battery in parallel with converter 50 and structured to supply DC electrical power to bus 33 at a varying voltage. It can thus be appreciated that electrical power can be supplied to computers 12 by way of either or both of power supply paths 30 and 32. In a practical implementation strategy, one mode of operation can include supplying electrical power only via path 30, but transitioning via switching elements from path 30 to path 32 only in the event of a fault, such as a fault or failure in converter 48. In the event of a fault in power supply path 32, such as in converter 50, battery 52 may be operated to supply DC electrical current to bus 33. In the illustrated embodiment, battery 52 may be trickle charged by way of a charger 54 coupled with an AC input bus 74, with battery 52 electrically connected to bus 33 by way of a maintenance switch or the like 60. Diodes 56 and 58 may be positioned electrically between battery 52 and charger 54 and electrically between battery 52 and switch 60, respectively. As discussed above, in certain embodiments a standard or normal operating condition can include supplying power via path 30, whereas a backup operating condition can include supplying power via path 32. As charger 60 may trickle charge battery 52, it can be sized at a much reduced capacity. In instances and for operating strategies where substantially all of the load of power supply unit 39 and associated electrical loads is carried by path 30, the system efficiency will be determined principally by an efficiency of buck converter 50. In certain embodiments, converters 48 and 50 may reduce voltage from a first level that is from about 700 volts to about 800 volts down to a second level that is from about 350 volts to about 450 volts.

Those skilled in the art will further be familiar with the additional costs that typically accompany the addition of components. Additional components, additional connections, additional power supplies and duplications of hardware are typically understood to improve reliability, but of course typically increase costs. What is generally less intuitive is the addition of potential failure modes with the addition or duplication of hardware. In other words, a system that has many different components versus a relatively simpler system with fewer components will often at first impression appear to be more reliable. When a more quantitative consideration of the likelihood of failure of the overall system, as well as likelihood of failure of subcomponents of the system is conducted, however, as in the present instance it becomes apparent that likelihood of failure is not in fact increased or only modestly so, where some of the duplication and addition of hardware is avoided. As described herein, power supply path 30 may have a lesser component count, for example a count of one, corresponding to power converter 48. Power supply path 32 may have a greater component count, for example a count of two, corresponding to converter 50 and battery 52. In the present instance, a sufficiently reliable or even more reliable system can be provided even though one of the possible power supply paths has fewer components, and in fact lacks the backup power supply of an energy storage device altogether. When a fault occurs in path 32, system 11 can be switched to a backup mode where electrical power is supplied via battery 52. Conventional systems might have included multiple power supply paths that were substantially identical, with each including a battery or other energy storage device. In the present instance, it can be seen that only one of paths 30 and 32 includes a battery.

In recent years, DC power supply systems have been increasingly applied in areas that traditionally relied upon AC. Demands for so-called greener power have resulted in the increased exploitation of renewables such as solar and wind and DC systems may be better suited to such applications than traditional AC, especially respecting efficiency and cost. The present disclosure provides similar advantages over AC systems. The present disclosure also provides advantages over many of the DC systems that been developed as AC alternatives, particularly with regard to the conventional wisdom respecting component count and failure modes.

Figure 2:
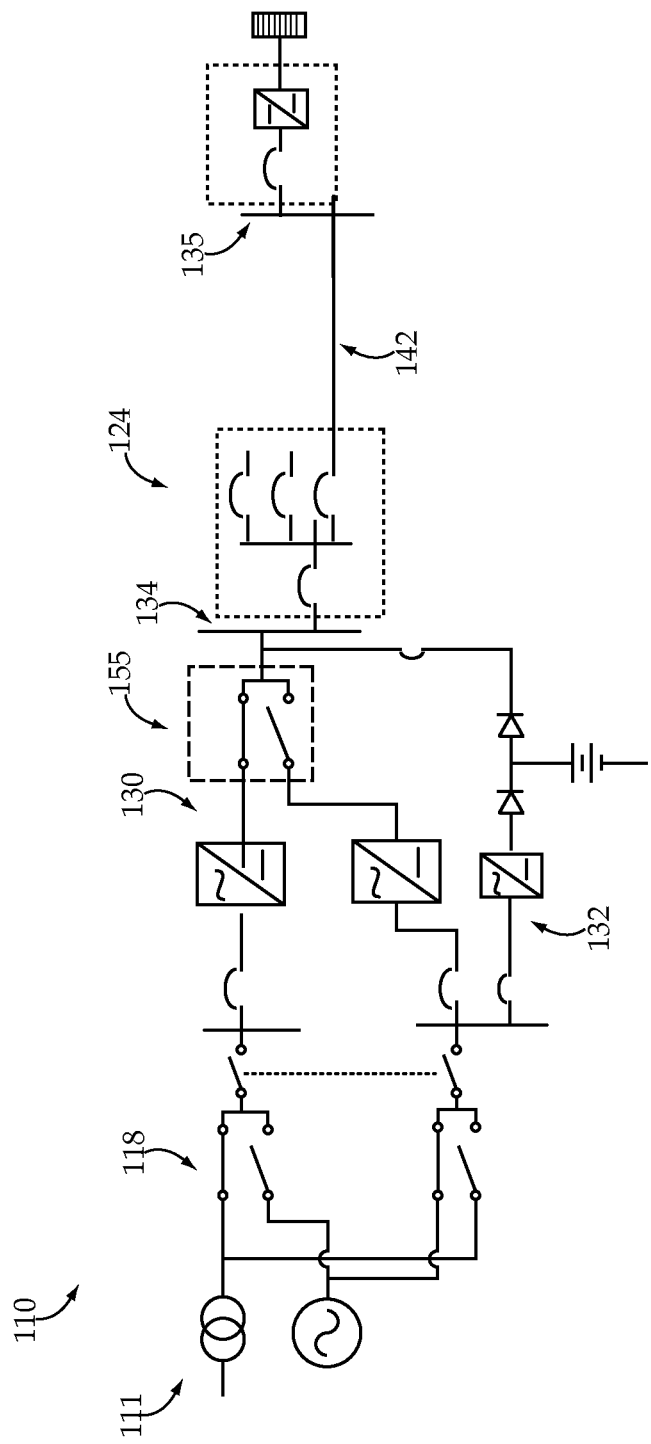
FIG. 2 is a diagrammatic view of a system according to another embodiment.

Referring to FIG. 2, there is shown a computer system 110 according to another embodiment. System 110 includes certain features similar or identical to those of system 10 described above, and including an uninterruptible power supply system 111. System 111 includes an AC input interface 118, a DC output interface 124, and a plurality of power supply paths coupled between AC input interface 18 and DC output interface 124. Each of power supply paths 130 and 132 may be configured generally analogously to power supply paths 30 and 32, however, as can be seen from FIG. 2 each of paths 130 and 132 supplies a common power bus 134. A DC feeder 142 extends between bus 134 and a remote power panel 135. DC feeder 142 will typically be a floating voltage DC feeder to accommodate varying voltage output by an energy storage device in power supply path 132. A single power distribution unit 124 is shown coupled with bus 134, although multiple power distribution units could certainly be provided. System 111 may thus be understood as having a total of one power bus 134, and a total of one remote power panel 135. Switching elements 155, such as suitable automated transfer switches or static transfer switches, may be used to switch system 111 between a first configuration where power supply path 130 supplies electrical power to remote power panel 135 and a second configuration where power supply path 132 supplies the electrical power. Other components shown in FIG. 2 and FIG. 3 but not specifically discussed herein will be understood to be structurally and functionally analogous to components shown and described in connection with other embodiments.

Figure 3:
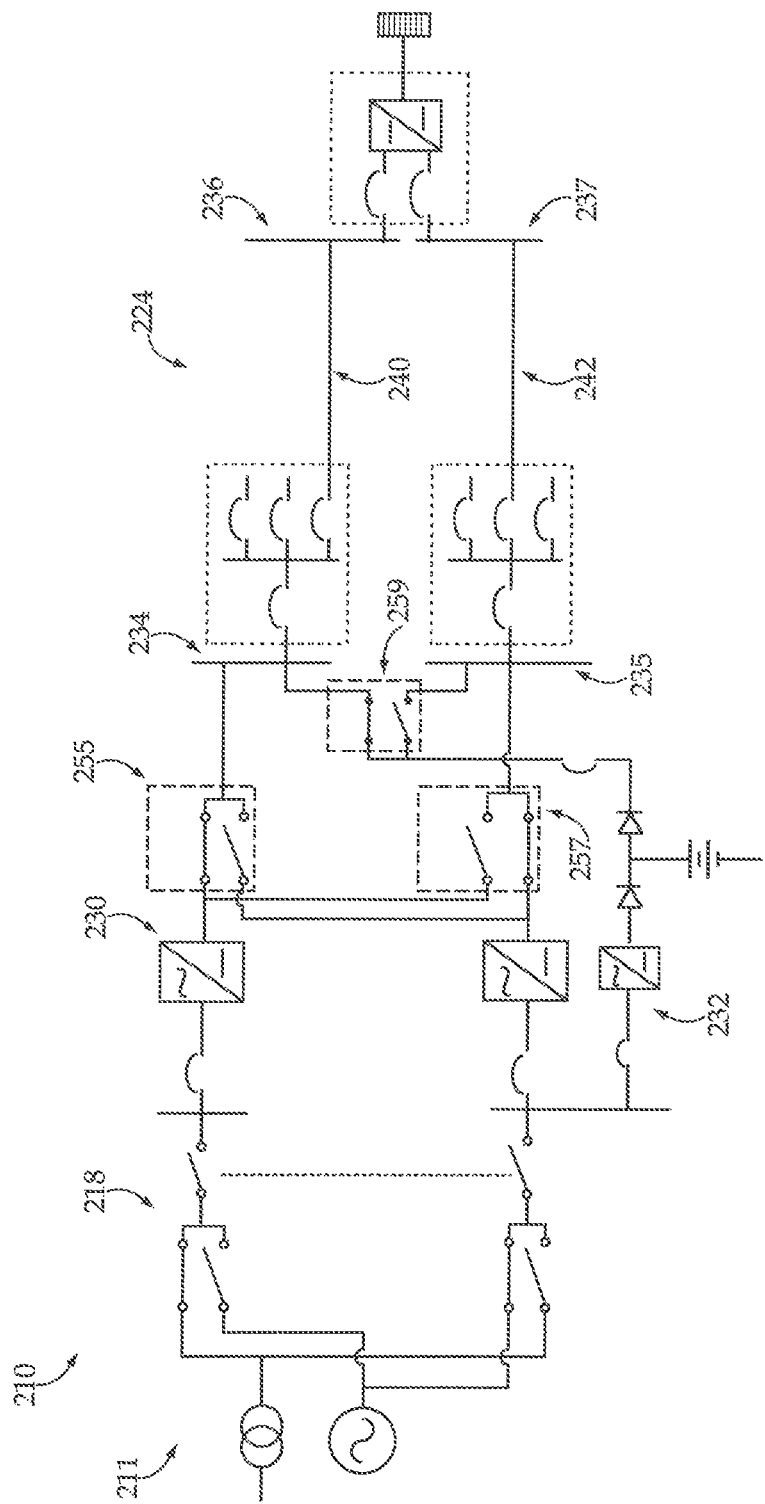
FIG. 3 is a diagrammatic view of a system according to yet another embodiment.

Referring to FIG. 3, there is shown a computer system 210 according to yet another embodiment. System 210 includes certain features similar or identical to those of systems 10 and 110 described above, and including an uninterruptible power supply system 211. System 211 includes an AC input interface 218, a DC output interface 224, remote power panels 236 and 237, power buses 234 and 235, and power supply paths 230 and 232. Switching elements 255 and 257, configured analogously to other switching elements described herein, are provided to enable buses 234 and 235 to be fed by either of power supply paths 230 and 232. Additional switching element(s) 259 is provided and enables an energy storage device such as a battery 252 in power supply path 232 to electrically connect with either of buses 234 and 235. To accommodate the varying voltage supplied by battery 252, DC feeders 240 and 242 may be of the floating voltage type having larger size cabling. As also discussed above in connection with other embodiments, other components such as single cord and dual cord power distribution and/or supply units, must typically have wide input ranges to accommodate floating voltages, and according to the present disclosure the need and costs of such hardware are negated. Switching elements 259 may be automated transfer switches or static transfer switches.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. An uninterruptible power supply (UPS) system comprising:
   an alternating current (AC) input interface structured to couple with an AC electrical power supply;
   a direct current (DC) output interface including at least one remote power panel;
   a plurality of power supply paths structured to supply electrical power from the AC input interface to the DC output interface so as to energize the at least one remote power panel for powering an electrical load;
   the DC output interface further including at least one power bus structured to receive DC electrical power from the plurality of power supply paths, and a DC feeder structured to feed DC electrical power from the at least one power bus to the at least one remote power panel;
   a first one of the plurality of power supply paths having a lesser component count, and including a first power converter structured to convert AC electrical power from the AC input interface to DC electrical power to be supplied to the at least one power bus at a fixed voltage; and
   a second one of the plurality of power supply paths having a greater component count, the second power supply path including a second power converter structured to convert AC electrical power from the AC input interface to DC electrical power to be supplied to the at least one power bus at a fixed voltage, and an energy storage device in parallel with the second power converter and structured to supply DC electrical power to the at least one power bus at a varying voltage.

2. The system of claim 1 wherein each of the first power converter and the second power converter includes an AC to DC buck converter.

3. The system of claim 2 wherein the at least one power bus includes a first power bus structured to receive DC electrical power from the first power supply path, and a second power bus structured to receive DC electrical power from the second power supply bus.

4. The system of claim 3 wherein the DC feeder includes a first DC feeder coupled between the first power bus and the at least one remote power panel and having standard electrical cabling structured for supplying DC electrical power at the fixed voltage, and further comprising a second DC feeder coupled between the second power bus and the at least one remote power panel and having oversized electrical cabling structured for supplying DC electrical power at the varying voltage.

5. The system of claim 3 wherein the energy storage device includes a battery electrically connected to the second power supply bus.

6. The system of claim 1 wherein the at least one power bus includes a total of one power bus structured to receive electrical power from each of the first power supply path and the second power supply path.

7. The system of claim 6 further comprising switching elements structured to switch the system from a first configuration where the first power converter is electrically connected within the first power supply path to the one power bus, and a second configuration where the second power converter is electrically connected within the second power supply path to the one power bus.

8. The system of claim 7 wherein the at least one remote power panel includes a total of one power panel.

9. The system of claim 6 wherein each of the first power converter and the second power converter includes an AC to DC buck converter.

10. An electrically powered computer system comprising:
    a plurality of computers;
    an uninterruptible power supply (UPS) system including an electrical power input interface structured to connect with an electrical power supply, and an electrical power output interface structured to supply the plurality of computers with electrical power from the electrical power supply;
    a first power supply path coupled between the input interface and the output interface, and including a first electrical power converter;
    a second power supply path coupled between the input interface and the output interface, and including a second electrical power converter; and
    the DC output interface further including at least one power bus structured to receive electrical power from the first power supply path and the second power supply path, and a DC feeder structured to feed DC electrical power from the at least one power bus to an at least one remote power panel;

a first one of the plurality of power supply paths having a lesser component count and including a first power converter structured to convert AC electrical power from the AC input interface to DC electrical power to be supplied to the at least one power bus at a fixed voltage; and a second one of the plurality of power supply paths having a greater component count, the second power supply path including a second power converter structured to convert AC electrical power from the AC input interface to DC electrical power to be supplied to the at least one power bus at a fixed voltage, and an energy storage device in parallel with the second power converter and structured to supply DC electrical power to the at least one power bus at a varying voltage.

11. The system of claim 10 wherein the lesser component count is one, and the greater component count is two.

12. The system of claim 10 wherein the at least one power bus includes a first power bus structured to receive DC electrical power from the first power supply path, and a second power bus structured to receive DC electrical power from the second power supply path.

13. The system of claim 12 wherein the DC feeder includes a first DC feeder coupled between the first power bus and the at least one remote power panel and having standard electrical cabling structured for supplying DC electrical power at the fixed voltage, and further comprising a second DC feeder coupled between the second power bus and the at least one remote power panel and having oversized electrical cabling structured for supplying DC electrical power at the varying voltage.

14. The system of claim 10 wherein each of the first power converter and the second power converter includes an AC to DC buck converter.

15. The system of claim 10 wherein the energy storage device includes a battery electrically connected to the at least one power bus.

16. The system of claim 10 wherein the at least one power bus includes a total of one power bus, and wherein each of the first power supply path and the second power supply path is coupled with the total of one power bus.

17. The system of claim 16 further comprising switching elements structured to switch the system from a first configuration where the first power converter is electrically connected within the first power supply path to the one power bus, and a second configuration where the second power converter is electrically connected within the second power supply path to the one power bus.

* * * * *